April 21, 1964     J. C. HOOVER     3,130,368
ELECTROMAGNETIC RADIATION MONITOR
Filed Jan. 23, 1962

INVENTOR.
JOHN C. HOOVER
BY
ATTORNEY

United States Patent Office 3,130,368
Patented Apr. 21, 1964

3,130,368
ELECTROMAGNETIC RADIATION MONITOR
John C. Hoover, Clearwater, Fla., assignor to Sperry Rand Corporation, Great Neck, N.Y., a corporation of Delaware
Filed Jan. 23, 1962, Ser. No. 168,077
6 Claims. (Cl. 325—364)

This invention relates to radiation responsive devices and more particularly to electromagnetic radiation monitoring devices.

Conventional electromagnetic radiation monitors usually require several antennas to cover a desired frequency range since each antenna usually responds only to a narrow band of frequencies. Furthermore, antennas for conventional monitors are sensitive to linear polarization of only one orientation. The user of such devices must make a series of radiation measurements employing each antenna in turn in order to determine the total energy in a given frequency range. Moreover, each antenna must be rotated axially in order to align the plane of polarization of the antenna with that of the received energy.

One of the principal objects of the present invention is to provide an improved radiation monitor that is equally responsive to signals of all frequencies within the desired range of measurements.

A further object of the present invention is to provide an improved radiation monitor that is equally responsive to all linearly polarized signals within the normal operating range of the instrument, regardless of the orientation of these signals.

Still another object of the present invention is to provide an improved radiation monitor that responds to the sum of all the received energy within the normal operating range regardless of frequency or orientation of the received signal.

According to the principles of the present invention, these and other objects are achieved by purposely distorting the constant gain characteristics of a frequency-independent antenna in order to obtain an output signal equivalent to that which would be obtained from a constant aperture antenna.

Figure 1:
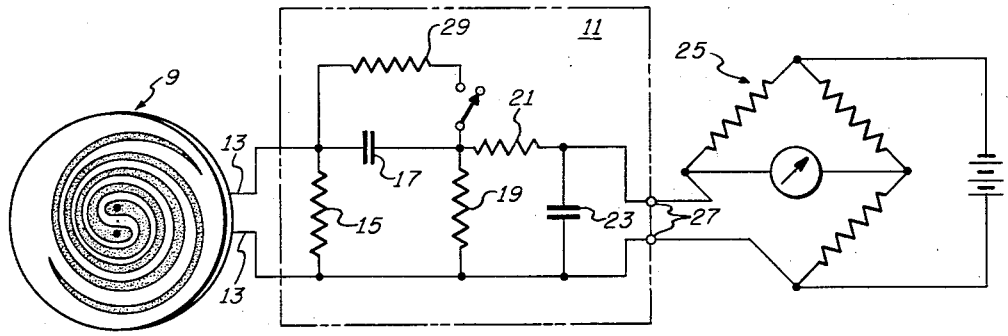
Figure 2:
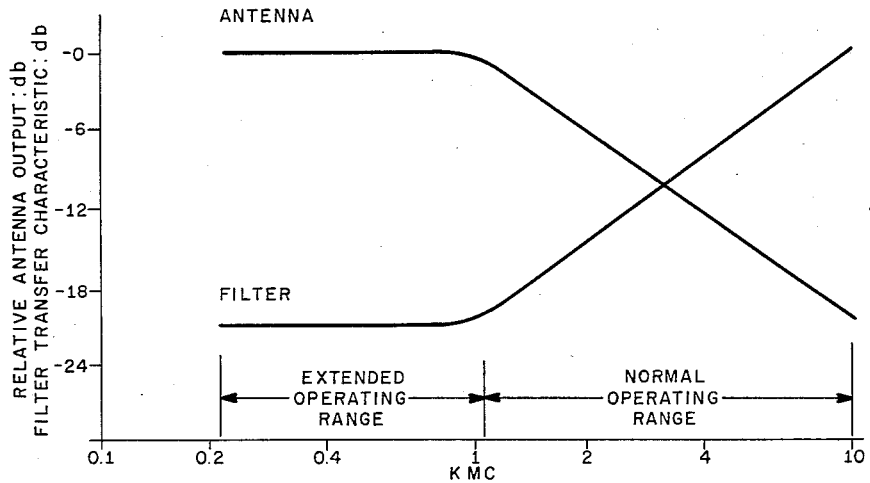
Figure 3:
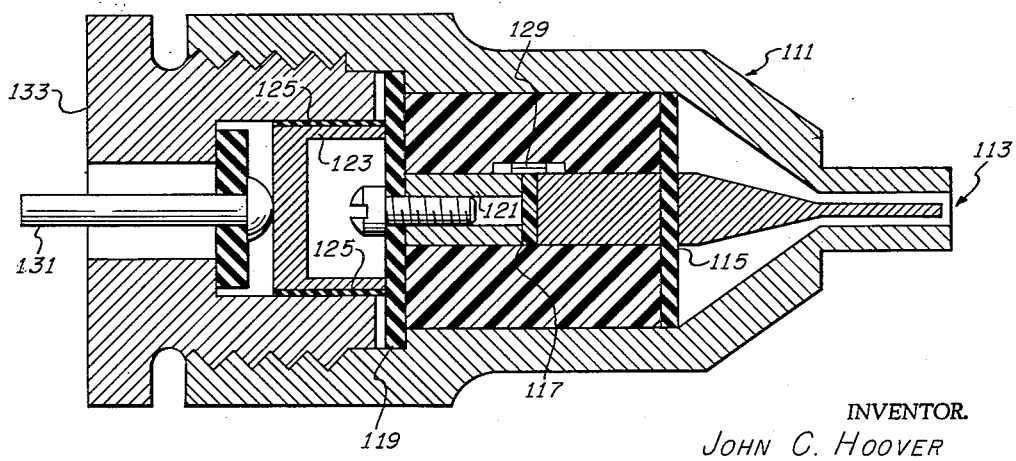

The invention will be described with reference to the accompanying drawings, wherein:

FIG. 1 is a schematic diagram, partly in perspective, of a circuit embodying the principles of the invention, FIG. 2 is a graph, useful in illustrating the operation of the invention at frequencies throughout the operating range, and FIG. 3 is an enlarged view, in longitudinal cross-section, of a structural embodiment of the compensating means shown schematically in FIG. 1.

Electromagnetic radiation monitors are useful in detecting dangerous stray radiation in the vicinity of radio frequency generators of various kinds. The total radiation may consist of components of various polarizations and frequencies, therefore if a single antenna is to be used to cover the entire range of interest, it must be capable of responding to a wide band of frequencies and to a variety of polarizations.

Various types of frequency independent-antennas are capable of satisfying these requirements. Such antennas provide a substantially constant gain over an extremely wide band of frequencies. The constant gain is achieved by virtue of the fact that the effective aperture of these antennas varies in response to changes in the frequency of the incident radio frequency energy.

One type of frequency-independent antenna that is particularly suitable for the present application is the equiangular spiral antenna. Antennas of this type are described by John D. Dyson in an article entitled "The Equiangular Spiral Antenna," appearing on pages 181–187 of the IRE Transactions on Antennas and Propagation, for April 1959.

Such an antenna consists of an open transmission line coiled into a spiral configuration and mounted on a flat dielectric support. Feed lines are preferably connected to the center of the spiral.

Variants of the spiral antenna include plane conductor antennas in which metallic arms are supported on the insulating backing, and slot type antennas in which spiral slots are cut in a large conducting sheet. Similarly, types of spirals other than equiangular, such as Archimedian or logarithmic spirals may be employed, although the equiangular form is presently preferred.

Radio frequency energy impinging on the antenna induces voltages in the spiral arms. At any instant, the voltages induced in each incremental element of the spiral are in the same direction in space. Because the conducting path is a spiral, however, these incremental voltages generally set up currents which tend to cancel. An exception exists in the case of the spiral turn which happens to have a perimeter equal to one wavelength. In this particular turn of the spiral, a positive lobe of current can just exist on one half of the turn, whereas a negative lobe can just exist on the other half of the turn. The currents induced in this turn produce a net effect tending to set up a travelling wave that can propagate toward the output terminals of the antenna. The particular turn which produces the travelling wave is determined by the wavelength of the incident energy.

Since the perimeter of the turn is equal to a wavelength, the mean diameter is proportional to the wavelength and the area enclosed by the turn is proportional to the square of the wavelength. In other words, the area of the effective aperture of this antenna is inversely proportional to the square of the frequency of the incident wave of energy. The antenna responds to the energy flowing in the region of space occupied by this effective aperture of the antenna.

Although the radiation monitor must operate over an extremely wide bandwidth, it must provide a signal that represents energy density. That is, the signal must be representative of the total energy traversing a constant cross sectional area in space. If a spiral antenna is to be used in such an instrument, it is necessary to modify the constant gain output from the antenna so that the signal eventually applied to the metering circuit is independent of variations in effective aperture.

The area of the effective aperture, and therefore the total energy collected by the antenna, varies inversely as the square of the frequency. Thus for a constant power density, the power output of the antenna increases fourfold or 6 db as the frequency of the incident energy is halved. Consequently, a compensating means capable of providing an insertion loss that increases 6 db per octave decrease in frequency will modify the antenna output as desired.

Filters are known that will display this characteristic. A high-pass filter comprising a capacitor that can be connected in series with a resistive load, for instance, can be made to perform in this manner. The rate of change of insertion loss of such a filter approaches the desired value of 6 db per octave as the ratio of reactance to resistance of the circuit increases. Under these conditions, the current through the load is substantially proportional to the frequency of the voltage applied to the filter.

Although the exact reactance to resistance ratio is a matter of choice in design, a ratio of 5 or more at the highest frequency to be measured presently appears desirable. Ratios as low as 2 have been use in situations in which instrument accuracy is not important.

FIG. 1 depicts a presently preferred circuit embodying the principles of the invention. A spiral antenna 9 is connected to a compensating means 11 through a pair of leads 13. One lead of this pair is conveniently connected to a common connector within the compensating means; the second of the pair of leads is connected to series filter elements in the compensating means. An impedance matching resistor 15 is connected across the output of the antenna to provide a suitable impedance match. Although the resistor 15 is not essential to the practice of the invention, this resistor improves the performance markedly since the input impedance of the resistance-capacitance network varies with frequency. The impedance matching resistor 15 is chosen to be of such a value that the compensating means presents a suitable load to the antenna.

The input signal is fed through a series capacitor 17 to the temperature sensitive resistors 19 and 21. The capacitor 17 constitutes a filter, and is selected so as to provide a reactance several times the magnitude of the resistance of the resistors 19 and 21 at the highest frequency to be measured. The temperature sensitive resistors are conveniently formed from bolometers of the thermistor type, although barretters or other types of square law detection devices can be used for this purpose. A bypass capacitor 23 is connected across the output of the compensating means. This capacitor provides a low impedance shunt across the bridge 25 so that radio-frequency currents do not flow in the bridge. The capacitor 23 also serves effectively to connect the temperature sensitive resistors 19 and 21 in parallel as far as the radio-frequency currents are concerned, but in series as far as the direct current bridge voltages are concerned.

The particular arrangement of the temperature sensitive resistors and the bypass capacitor depicted in FIG. 1 forms a convenient arrangement, although alternative arrangements of these elements may be employed. A Wheatstone bridge 25, or other resistance-measuring device is connected to a pair of output terminals 27. The resistance of the resistors 19 and 21 is affected by the power received from the antenna. This resistance, in turn, is monitored by the resistance-measuring device 25.

A range-extending resistor 29, shunting the series capacitor 17 may be included in the filter if desired. This resistor permits readings to the obtained at frequencies below the normal operating range of the antenna. At these frequencies it has been found that the antenna still responds to incident energy even though the wavelength of this energy is longer than the perimeter of the outermost turn of the antenna spiral. In this region, the aperture of course does not change with frequency, therefore a constant insertion loss compensation characteristic is required. By selecting a value of resistance for the resistor 29 that is equal in magnitude to the reactance of the series capacitor 17 near the lowest frequency in the normal operating range of the antenna, the desired characteristic may be realized. As the frequency is lowered beyond the normal operating range, the reactance of the capacitor 17 increases rapidly so that the impedance of the combination filter is practically equal to the resistance of the range-extending resistor 29. The insertion loss in this range is thus made independent of frequency.

The antenna is linearly polarized in this extended frequency range and the plane of polarization of the antenna must be aligned with that of the incident energy.

FIG. 2 is a graphical representation of the response of individual components in a typical radiation monitor constructed in accordance with the principles of the invention.

The effect of the range-extending resistor 27 is also indicated in this graph.

The first curve represents the relative antenna output throughout the operating range, expressed in decibels relative to the output obtainable at the lowest frequency of operation. This output is directly proportional to the effective aperture of the antenna.

The second curve illustrates the filter transfer characteristics, measured as a ratio of filter output to input voltage and expressed in decibels below the value for the highest operating frequency.

These particular curves were plotted so as to illustrate the reciprocal nature of the output of the two components. Proper selection of the series capacitor provides a slope in the transfer characteristic that just compensates for the slope in the antenna output curve. Proper selection of the range-extending resistor modifies the low frequency portion of the transfer characteristic so as to maintain a constant attenuation in the extended frequency range wherein the effective aperture of the antenna is constant.

The compensation means thus cooperates to provide a meter indication that is equally responsive to power density for all frequency components within the operating range.

FIG. 3 is a view, in longitudinal cross section, of a practical structural embodiment of the compensating means shown schematically in FIG. 1. This embodiment is coaxial in form. The antenna (not shown) with which this particular compensator is used, is an equiangular slot type antenna, with a maximum slot radius of approximately 3½". The operating range is from 200 mc. to 10 kmc.

Antenna energy is coupled to the compensator 111 through coaxial input line 113. The energy passes through a tapered transition section to the impedance matching resistor 115. This resistor is composed of a plastic disc approximately ½" in diameter and coated with a conductive paint having a surface resistance in the order of 200 ohms per square. A series capacitor 117 is inserted in the center conductor. In the embodiment under consideration, the capacitor 117 is constructed from a disc of polystyrene approximately 0.132" in diameter and 0.026" thick. Energy passes through the series capacitor and is absorbed in a pair of thermistors mounted in the thermistor assembly 119. Thermistor assembly 119 comprises essentially a nonconducting disc supporting a pair of thermistors radially in the space between the center conductor and the outer conductor. Thermistor assemblies of this type are described in a copending patent application of Howard L. Martin, S.N. 92,228, filed February 28, 1961, and assigned to the same assignee as the present application. Briefly, the thermistor assembly in the present invention serves to connect a first thermistor from the center conductor 121 to the outer conductor, and a second thermistor from the center conductor to a capacitor contactor 123. A nonconducting coating is applied to the longitudinal surfaces 125 of the capacitor contactor 123. This provides capacitive coupling between the contactor and the outer conductor, and thus serves as a bypass capacitor. A range-extending resistor 129 is formed from a resistive strip having a resistance of approximately 50 ohms and shunted across the series capacitor 117. The capacitor contactor also serves to connect the second thermistor to a contact pin 131. External measuring means can be connected between the contact pin and the metallic cap 133.

Although the invention has been described in terms of spiral antennas and a specific resistance-capacitance compensating means, a variety of other types of antennas may be employed.

V. H. Rumsey, in an article entitled "Frequency Independent Antennas" appearing on pages 114–118 in part I of the 1957 IRE National Convention Record, has pointed out that the spiral antenna is one of a large class of extremely wide band, constant gain, variable aperture antennas. Since the present invention is basically concerned with converting the constant gain output of such an antenna to an equivalent constant aperture signal in order to obtain an indication of power density, it will be apparent to those skilled in the art that other types of frequency-independent antennas can be employed in practicing the invention.

Similarly, other types of compensation circuits such as multi-section or inductance-resistance-capacitance filters can be employed to provide the desired signal conversion.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. An electromagnetic radiation monitor comprising a spiral antenna having an outer turn with a perimeter equal to the longest wavelength in the normal operating range, a filter coupled to receive energy from the antenna, said filter constructed and arranged to introduce an insertion loss that changes in proportion to changes in the effective aperture of said antenna throughout the normal operating range, said filter being further constructed and arranged to provide a substantially constant insertion loss at frequencies below the normal operating range, and a detecting means coupled to receive energy from said filter.

2. An electromagnetic radiation monitor comprising a spiral antenna having an outer turn with a perimeter equal to the longest wavelength in the normal operating range, a filter connected to receive a signal from the antenna, and a square law detection means connected to the output of the filter, said filter containing a series capacitor of such a value that it introduces an insertion loss substantially proportional to the square of the wavelength of the received energy throughout the normal operating range of the spiral antenna, and a resistor shunting the series capacitor, said resistor being of such a value that it provides a substantially constant insertion loss for frequencies below the normal operating range of the antenna.

3. Apparatus for measuring radio frequency power comprising a spiral antenna, a high-pass filter coupled to receive energy from the antenna, and a square-law detection means coupled to receive energy from the filter; said filter including a series capacitor of such value that the insertion loss of the filter increases at a rate of substantially 6 db per octave decrease in frequency in the normal operating range of the antenna; and a resistor shunting said capacitor, said resistor being of such value that it provides a substantially constant insertion loss for frequencies below the normal operating range of the antenna.

4. Apparatus for measuring radio frequency power comprising a frequency-independent antenna, a high-pass filter coupled to receive energy from the antenna, and a bolometer connected to the output of the filter; said filter comprising a series capacitor having a reactance several times the magnitude of the resistance of the bolometer for frequencies in the normal operating range of the antenna, and a resistor shunting said capacitor having a resistance equal in magnitude to the reactance of said capacitor near the lowest frequency in the normal operating range of the antenna.

5. Apparatus for measuring radio frequency power comprising a frequency-independent antenna, a high-pass filter coupled to receive energy from the antenna, and a bolometer connected to the output of the filter; said filter comprising a series capacitor having a reactance in the normal operating range that is large in comparison with the resistance of the bolometer so that the current through the bolometer in this range is substantially proportional to the frequency of the voltage applied to the filter, and a resistor shunting said series capacitor having a resistance equal in magnitude to the reactance of the capacitor near the lowest frequency in the normal operating range.

6. A compensating means for a frequency-independent antenna comprising:
    (a) a pair of connecting leads for interconnecting the antenna and the compensating means,
    (b) a pair of output terminals,
    (c) a common connector interconnecting the first of said pair of connecting leads and the first of said pair of output terminals,
    (d) an impedance matching resistor connected between said connecting leads,
    (e) a series capacitor connected to the second of said pair of connecting leads,
    (f) a first temperature sensitive resistor connected between the series capacitor and the common connector so as to receive energy through said series capacitor,
    (g) a second temperature sensitive resistor connected between the series capacitor and the second of said pair of output terminals,
    (h) a bypass capacitor connected across said pair of output terminals,
    (i) said series capacitor being characterized in that it has a reactance several itmes the magnitude of the resistance of said temperature sensitive resistors in the normal operating range of the antenna, and
    (j) a range-extending resistor connected across the series capacitor and having a resistance equal in magnitude to the reactance of the series capacitor near the low frequency limit of the normal operating range of the antenna.

References Cited in the file of this patent
UNITED STATES PATENTS

| | | |
|---|---|---|
| 2,478,311 | Pease | Aug. 9, 1949 |
| 2,737,629 | Beerbaum et al. | Mar. 6, 1956 |
| 2,791,686 | Lambert | May 7, 1957 |
| 2,854,643 | Wigan et al. | Sept. 30, 1958 |
| 2,863,145 | Turner | Dec. 2, 1958 |

FOREIGN PATENTS

| | | |
|---|---|---|
| 645,818 | Great Britain | Nov. 8, 1950 |
| 216,714 | Australia | Aug. 8, 1958 |